(12) United States Patent
Laitinen

(10) Patent No.: US 8,149,604 B2
(45) Date of Patent: Apr. 3, 2012

(54) METHOD OF CONTROLLING A RECTIFYING BRIDGE AND A CIRCUIT FOR THE CONTROL

(75) Inventor: Matti Laitinen, Kirkkonummi (FI)

(73) Assignee: ABB OY, Helsinki (FI)

( * ) Notice: Subject to any disclaimer, the term of this patent is extended or adjusted under 35 U.S.C. 154(b) by 341 days.

(21) Appl. No.: 12/495,916

(22) Filed: Jul. 1, 2009

(65) Prior Publication Data

US 2010/0039161 A1 Feb. 18, 2010

(30) Foreign Application Priority Data

Aug. 12, 2008 (EP) .................................. 08162210

(51) Int. Cl.
*H02M 7/155* (2006.01)
(52) U.S. Cl. .......................................... 363/129; 363/88
(58) Field of Classification Search .................... 363/87, 363/88, 129, 85–86, 128; 327/441, 443, 327/448
See application file for complete search history.

(56) References Cited

U.S. PATENT DOCUMENTS 3,796,918 A * 3/1974 DeForest et al. ................. 361/94
4,274,135 A 6/1981 Rosa et al.
4,521,825 A * 6/1985 Crawford ....................... 361/253

FOREIGN PATENT DOCUMENTS

DE 1 463 635 8/1969
FR 2 253 304 6/1975

OTHER PUBLICATIONS

Non-English Action from the Chinese Patent Office dated Nov. 23, 2011 for Application No. 200910161070.4 and an English-language version.

* cited by examiner

*Primary Examiner* — Harry Behm
(74) *Attorney, Agent, or Firm* — Ladas & Parry LLP

(57) ABSTRACT

A circuit for controlling a thyristor (V1) into conducting state, the thyristor (V1) being in a rectifier, which rectifier is adapted to supply DC voltage to a DC voltage circuit. The circuit comprises a pulse transformer (T1), means for generating voltage pulses on the primary winding of the pulse transformer (T1), a trigger capacitor (C2) adapted to be charged from the voltage pulses in the secondary winding of the pulse transformer, a zener diode (V5) adapted to be triggered with the voltage of the trigger capacitor (C2) when the voltage of the trigger capacitor (C2) exceeds the breakdown voltage of the zener diode (V5), and an auxiliary thyristor (V3) adapted to be triggered with the current from the trigger capacitor (C2) flowing via the zener diode (V5), wherein the cathode of the auxiliary thyristor (V3) is connected to the gate of the thyristor (V1) for triggering the thyristor (V1) with the current from the trigger capacitor (C2) flowing via the auxiliary thyristor (V3).

7 Claims, 1 Drawing Sheet

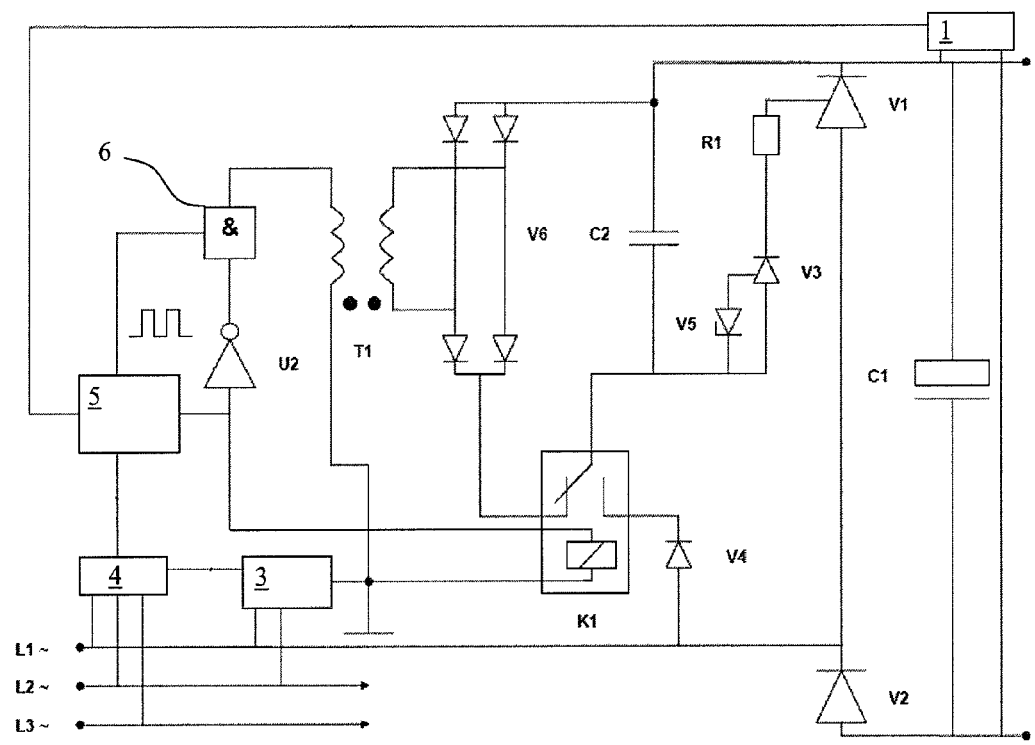

METHOD OF CONTROLLING A RECTIFYING BRIDGE AND A CIRCUIT FOR THE CONTROL

FIELD OF THE INVENTION

The present invention relates to a method of controlling a rectifying bridge and to a circuit for controlling the thyristors of the rectifying bridge, and particularly to a method and circuit which are used in a rectifying bridge for charging the DC voltage circuit using the rectifying bridge.

BACKGROUND OF THE INVENTION

Frequency converters typically have a DC voltage intermediate circuit which stores DC voltage for use for the inverter part. The inverter of a frequency converter is typically used for producing controlled alternating voltage to a load from the voltage of the intermediate circuit. The DC voltage to the intermediate circuit is rectified typically from AC mains voltage by using a rectifier bridge.

The DC voltage intermediate circuit or DC bus contains one or multiple capacitors for storing and smoothing the voltage. The capacitance of the intermediate circuit capacitors is large and when the frequency converter is taken into use, these capacitors have to be charged before any control operations can be carried out.

The capacitors of the intermediate voltage circuit are charged from the supplying mains voltage. The charging current has to be limited to a suitable level since otherwise the large current would harm the electrical components of the rectifier or cause erroneous operations of the protective components, such as fuses and like. The current limitation is typically carried out either by using a charging resistor or by controlling the controllable switches of the rectifier.

The use of a charging resistor is a simple and reliable method for charging the intermediate circuit. Charging with a charging resistor requires additional components which are expensive especially when the power level is high.

One type of rectifier commonly used also in frequency converters is a half-controlled rectifier bridge. The half-controlled bridge consists of multiple series connections of thyristors and diodes, and usually the thyristors are the upper components and thus their cathodes are connected to the positive rail of the DC intermediate circuit.

Once the intermediate circuit capacitor has been charged to a voltage that is near the value of the rectified mains voltage, the charging phase is over and the thyristors in the rectifier are usually operated as diodes. This means that the thyristors are controlled to a conducting state as soon as the anode-to-cathode voltage is positive, and the thyristor can be triggered to a conducting state. This operation of thyristors in diode mode, i.e. at full phase angle, ensures maximal voltage to the DC intermediate circuit.

It is widely known that in control methods where also the diode mode relies on phase angle control, there is a compromise between reliability and dynamic response. This may cause malfunctions in line voltage dips and other rapid changes of the line voltage.

It would be desirable to obtain a phase angle control circuit that is simple in design and enables fast and reliable operation in diode mode for charging the intermediate circuit capacitor. Further it would be desirable to be able to resize the control circuit topology easily to all power levels.

BRIEF DESCRIPTION OF THE INVENTION

An object of the present invention is to provide a method and a circuit for implementing the method so as to solve the above problem. The objects of the invention are achieved by a method and an arrangement which are characterized by what is stated in the independent claims. The preferred embodiments of the invention are disclosed in the dependent claims.

The invention is based on the idea of providing trigger pulses for the thyristor by using a trigger capacitor that is charged by voltage pulses using a pulse transformer. The voltage charged to the trigger capacitor is de-charged to the gate of the thyristor when the voltage of the trigger capacitor exceeds a set limit, thereby turning on the thyristor reliably.

An advantage of the method and circuit of the invention is that the circuit is easy to implement in different power levels and that the circuitry used in charging can also be used in connection with the diode-mode operation, thereby facilitating the change from charging-mode to a very reliable diode-mode operation and eliminating the need for two completely separate circuits.

BRIEF DESCRIPTION OF THE DRAWINGS

In the following the invention will be described in greater detail by means of preferred embodiments with reference to the accompanying drawings, in which FIG. 1 illustrates the circuit of the invention in connection with a control circuit for controlling thyristors to diode mode.

DETAILED DESCRIPTION OF THE INVENTION

FIG. 1 shows the circuit according to the present invention in connection with a circuitry that controls the thyristor V1 in the diode mode operation. The aim of the circuit and method of the invention is to charge the DC circuit capacitor C1 using phase angle control. The capacitor C1 is charged with the method and circuit to a voltage level that enables to start using thyristor V1 in a diode mode without causing excessive current rush to the capacitor C1.

The capacitor C1 is connected between positive and negative rails of the DC circuit. In a frequency converter the inverter part is connected to the DC circuit for providing alternating current to a load. In connection with frequency converters, the DC circuit is usually referred to as a DC intermediate circuit or DC link. The inverter part is not, however, shown in FIG. 1. Further, FIG. 1 shows only one leg of the rectifier that supplies DC voltage to the intermediate circuit, the other legs being omitted for simplicity. The rectifier leg consisting of thyristor V1 and diode V2 shown in FIG. 1 is connected to a supplying phase L1. The other phases L2, L3 of the three-phase alternating voltage supply should be similarly connected to the legs of the rectifier omitted in the FIG. 1.

The circuit for charging thyristor V1 can be divided into two interrelated operative components; firstly, a circuitry that determines the correct time instants for triggering the capacitor and produces pulses for initiating the triggering, and, secondly, the triggering circuit itself that produces gate pulses for the thyristor. This invention relates to the production of the gate pulses for triggering the thyristor V1. The determination of correct time instants for triggering can be carried out in multiple ways, and for the present invention it is irrelevant how the time instants are calculated.

FIG. 1 shows a PLL circuit 4 for synchronization with the supplying network. The synchronization is needed for the timing of the trigger pulses and for determining which one of the supply phases is to be controlled. Further, a power supply 3 in indicated in FIG. 1. The power supply is required for powering the operations relating to charging of the capacitor and also for other powering purposes in the device. Power supply 3 is shown in FIG. 1 to be connected to the input phases and thus it generates suitable auxiliary voltage from the supplying network.

Further, a charging control block 5 is shown in FIG. 1. The charging control block receives inputs from the phase locked-loop circuit 4 and from the DC voltage measurement circuit 1. The charging control block 5 determines from its inputs the time instants for trigger pulses and produces these pulses to a logic summation element or an AND circuit 6. Block 5 also determines when the charging mode can be ended and controls a change over switch or a relay K1 accordingly. The purpose of the relay K1 is explained more closely below. The control information of the relay is inverted and fed to the summation element 6. Thus the logic summation element 6 receives information of the state of the relay K1. The purpose of the logic summation element 6 is to forward the pulses from the charging control circuit 5 only if the charging mode operation is in process. The pulses from the AND operator circuit 6 are further fed to the primary winding of a pulse transformer. It should be noted that the formation of these pulses is explained above in connection with one possible example. Further, the connections shown in FIG. 1 with respect to the above example are drawn only to show the interrelations of different features as signals and not as complete electrical circuits.

The circuit of the present invention comprises a pulse transformer T1 and means for generating voltage pulses to the primary winding of the pulse transformer. These means for generating the voltage pulses may consist of a voltage source that can be switched to provide a voltage pulse to the primary winding. These voltage pulses to the primary of T1 are applied only when the relay is in its charging position as emphasised by the combination of the AND circuit 6 and the inverting circuit U2.

The circuit of the invention further comprises a trigger capacitor C2 adapted to be charged from the voltage pulses in the secondary winding of the pulse transformer T1. Thus the voltage pulses generated to the primary winding of the pulse transformer T1 are seen in the secondary winding. A trigger capacitor C2 is connected in parallel with the secondary winding with the relay K1 when the charging mode operation is ongoing. The secondary of the pulse transformer T1 is connected further via a diode bridge V6 to the capacitor C2. The diode bridge V6 ensures that caused voltage pulses charge the capacitor to a correct polarity and also ensures that the transformer does not saturate.

Further, the circuit of the invention comprises a zener diode V5, which is adapted to be triggered with the voltage of the trigger capacitor C2 when the voltage of the trigger capacitor C2 exceeds the breakdown voltage of the zener diode V5. Thus the pulses from the pulse transformer charge the trigger capacitor C2. As seen in FIG. 1, an auxiliary thyristor V3 is in the circuit of the invention such that its anode is connected to the cathode of the zener diode V5 and its gate is connected to the anode of the zener diode. When the voltage of the trigger capacitor exceeds the breakdown voltage of the zener diode, the auxiliary thyristor is triggered from the charge flowing from the trigger capacitor.

The cathode of the auxiliary thyristor V3 is further connected to the gate of the thyristor V1 for triggering the thyristor V1 with the current from the trigger capacitor C2 flowing via the auxiliary thyristor V3. Thus voltage pulses generated to the primary winding of the pulse transformer T1 charge the trigger capacitor C2 via the transformer and diode bridge V6. When the voltage of the trigger capacitor has risen to a level higher than the breakdown voltage of the zener diode, the thyristor is triggered with the voltage of the capacitor. Once the thyristor V1 is triggered, current from the supplying network is free to flow and charge the capacitor C1 further.

When the charging control circuit 5 determines that the rectified voltage measured by means for measuring 1 is as high as needed, the operation is changed to diode mode operation. The change in operation state is carried out by controlling the relay K1. When the relay K1 is in the position shown in FIG. 1, the circuitry of FIG. 1 is in the charging mode and the operation is as explained above. When the contactor of the relay K1 is controlled to a position which connects diode V4 to the trigger capacitor, the components C2, V5 and V3 are used for triggering the thyristor in the diode mode operation. This operation in diode mode is also explained below shortly.

When the cathode of the diode V4 is in an electrical contact with the triggering circuit, the capacitor C2 is charged from the voltage difference between supply line L1 and positive rail Udc+ of the voltage intermediate circuit. More specifically, the capacitor C2 is charged when the voltage of the supply line L1 exceeds the voltage of the intermediate voltage circuit. Diode V4 is used to block the current to the capacitor C2 when the supply line voltage is lower than the intermediate circuit voltage.

At the same time as the capacitor C2 charges in the diode mode, the thyristor V1 of the rectifier is forward-biased, i.e. the anode-to-cathode voltage is positive, and the thyristor can be triggered. In fact, the capacitor C2 and the thyristor V1 are connected in parallel when the diode V4 conducts.

When the voltage in the trigger capacitor C2 rises in the diode mode, the same voltage is seen also in the parallel circuit. The voltage builds up in this parallel circuit in the zener diode through the cathode and gate of thyristor V1, gate resistor R1 and the cathode and gate of the auxiliary thyristor V3. Nearly all the voltage of the trigger capacitor is seen over the zener diode, since the cathode to gate voltage of the thyristors is negligible when the thyristors are in blocking state.

The voltage of the trigger capacitor rises in the diode mode operation because the line voltage of supply line L1 is higher than the positive rail voltage Udc+, and once the voltage in the trigger capacitor has risen above the breakdown voltage of the zener diode V5, the capacitor C2 starts to discharge through the zener diode V5. This current from the capacitor flows further to the gate of the auxiliary thyristor V3 and triggers the thyristor V3.

The auxiliary thyristor V3 moves into conducting state and the voltage build-up from the trigger capacitor C2 discharges further through the thyristor V3 via the gate resistor R1 to the gate of the thyristor V1. The gate of the thyristor receives a strong current originating from the trigger capacitor and the thyristor V1 is turned into conducting state similarly as in the charging mode operation.

As described above, the same trigger circuit can be used for both charging mode and diode mode operation. The difference between these states is the source of voltage to the trigger capacitor C2. In the charging mode operation the capacitor is charged with voltage pulses generated via the pulse transformer and in the diode mode operation the capacitor is charged from the voltage difference between the supplying line voltage and the positive rectified voltage Udc+. The change between these operation modes can be carried out smoothly with the action of the relay K1.

The zener diode V5 in the circuit of the invention allows the voltage in the capacitor C2 to rise to such a level that the charge in the capacitor C2 is able to reliably turn on the controlled thyristor V1.

In the above, the functioning of the charging mode operation is described only with respect to one phase. In FIG. 1, however, the supply voltage is a three-phase voltage. The charging of the capacitor C1 can be carried out using only one phase, as described above, or using all supplying phases. If multiple phases are used for charging, the circuitry of FIG. 1 needs to be provided for all phases except for voltage measurement 1, phase locked loop 4 and power supply 3.

In the above, the invention is described in connection with a frequency converter. In a frequency converter an inverter part is connected to the intermediate voltage circuit. It is however clear that the DC voltage generated to the DC voltage circuit, such as the intermediate voltage circuit, can be used by any other device that is suitable for using DC voltage as input voltage.

It is clear for a skilled person that the method and circuit of the invention can also be used in connection with supplying voltages having an arbitrary number of phases. The present invention can also be used in connection with, for example, 12 pulse bridges. In the above, the invention is described in connection with a half-controlled bridge in which the controllable thyristor is in a higher potential than the diode. It is, however, clear that the invention can be carried out also in connection with a bridge, where controllable thyristor takes the place of the diode V2 and the diode takes the place of the thyristor V1.

It will be obvious to a person skilled in the art that, as the technology advances, the inventive concept can be implemented in various ways. The invention and its embodiments are not limited to the examples described above but may vary within the scope of the claims.

The invention claimed is:

1. A circuit for controlling a thyristor (V1) into conducting state, the thyristor (V1) being in a rectifier, which rectifier is adapted to supply a DC voltage to a DC voltage circuit, characterized in that the circuit comprises
   a pulse transformer (T1),
   means for generating voltage pulses on the primary winding of the pulse transformer (T1),
   a trigger capacitor (C2) adapted to be charged from the voltage pulses in the secondary winding of the pulse transformer,
   a zener diode (V5) adapted to be triggered with the voltage of the trigger capacitor (C2), when the voltage of the trigger capacitor (C2) exceeds the breakdown voltage of the zener diode (V5), and
   an auxiliary thyristor (V3) adapted to be triggered with the current from the trigger capacitor (C2) flowing via the zener diode (V5), wherein the
   cathode of the auxiliary thyristor (V3) is connected to the gate of the thyristor (V1) for triggering the thyristor (V1) with the current from the trigger capacitor (C2) flowing via the auxiliary thyristor (V3).

2. A circuit according to claim 1, characterized in that the circuit further comprises
   means (1) for measuring the voltage of the DC voltage circuit and
   means for changing the operation mode of the circuit from charging mode to diode mode in response to the means for measuring the voltage.

3. A circuit according to claim 2, characterized in that the means for changing the operation mode of the circuit include a controllable switch (K1), which is adapted to couple the trigger capacitor (C2) either
   in parallel with the secondary of the pulse transformer (T1) for operation in charging mode or
   between a supplying phase voltage and a positive rail (Udc+) of the DC voltage circuit via a diode (V4), which is connected so as to enable the trigger capacitor (C2) to be charged when the supplying phase voltage is higher than the voltage of the positive rail (Udc+) of the DC voltage circuit for operation in diode mode.

4. A frequency converter comprising a circuit according to claim 1.

5. A method of controlling a thyristor (V1) into conducting state, the thyristor (V1) being in a rectifier, which rectifier supplies DC voltage to a DC voltage circuit, characterized in that the method comprises the following steps:
   forming a voltage pulse to a primary winding of a pulse transformer (T1),
   charging a trigger capacitor (C2) with a voltage pulse from the secondary circuit of the pulse transformer,
   triggering a zener diode (V5) with the voltage of the trigger capacitor (C2) when the voltage of the trigger capacitor (C2) exceeds the breakdown voltage of the zener diode (V5),
   triggering an auxiliary thyristor (V3) with the current from the trigger capacitor flowing via the zener diode (V5), and
   triggering the thyristor (V1) with the current from the trigger capacitor (C2) flowing via the cathode of the auxiliary thyristor (V3) to the gate of the thyristor for using the thyristor (V1) in a diode mode.

6. A method according to claim 5, characterized in that the method further comprises the steps of
   measuring the voltage of the DC voltage circuit,
   changing the operation mode of the circuit in response to the measured voltage from the charging mode operation to diode mode operation by charging the trigger capacitor from the voltage over the thyristor instead of the secondary circuit of the pulse transformer.

7. A method according to claim 5, wherein the DC voltage circuit is the intermediate circuit of a frequency converter and the method is carried out in said frequency converter.

* * * * *